US008970352B2

(12) United States Patent
Holt et al.

(10) Patent No.: US 8,970,352 B2
(45) Date of Patent: Mar. 3, 2015

(54) REMOTE ACTIVATED GARAGE DOOR OPENER FUNCTIONS VIA A GRAPHICAL USER INTERFACE IN A VEHICLE

(71) Applicant: GM Global Technology Operations LLC, Detroit, MI (US)

(72) Inventors: Timothy H. Holt, Davison, MI (US); Kenneth M. Swartz, Columbus, MI (US); Mark R. Willey, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 220 days.

(21) Appl. No.: 13/658,274

(22) Filed: Oct. 23, 2012

(65) Prior Publication Data

US 2014/0111320 A1 Apr. 24, 2014

(51) Int. Cl.

*G05B 11/01* (2006.01)
*B60R 1/12* (2006.01)
*G08B 21/00* (2006.01)

(52) U.S. Cl.

USPC ...... 340/12.24; 340/5.23; 340/5.64; 340/5.71

(58) Field of Classification Search

CPC ........ B60R 1/12
USPC ........ 340/5.23, 5.2, 5.64, 5.71, 13.25, 340/825.22, 12.24; 701/36, 29.1
See application file for complete search history.

(56) References Cited

U.S. PATENT DOCUMENTS

| | | | | |
|---|---|---|---|---|
| 5,854,593 | A * | 12/1998 | Dykema et al. | 340/12.23 |
| 6,667,684 | B1 * | 12/2003 | Waggamon et al. | 340/5.71 |
| 7,116,221 | B2 * | 10/2006 | Addy | 340/539.14 |
| 8,138,883 | B2 * | 3/2012 | Shearer | 340/5.23 |
| 8,170,748 | B1 * | 5/2012 | Schofield et al. | 701/36 |
| 8,311,490 | B2 * | 11/2012 | Witkowski et al. | 455/70 |
| 8,330,572 | B2 * | 12/2012 | Rodriguez et al. | 340/5.71 |
| 8,346,432 | B2 * | 1/2013 | Van Wiemeersch et al. | 701/36 |
| 2008/0079570 | A1 * | 4/2008 | Fineman et al. | 340/545.1 |

* cited by examiner

*Primary Examiner* — Nam V Nguyen
(74) *Attorney, Agent, or Firm* — Cantor Colburn LLP

(57) ABSTRACT

Implementing remote garage door opener functions includes providing, via a computer processor, a graphical user interface on a display device and prompting a user via the graphical user interface to program a garage door opener unit that is in communicative range of a transceiver. The functions also include receiving a response, from the user via an input control of the display device, indicating an acceptance by the user to program the garage door opener unit. Upon determining via the transceiver that the garage door opener unit is in programming mode, the functions include transmitting a request to the transceiver over a vehicle network to initiate synchronization between the vehicle and the garage door opener unit and receiving, from the garage door opener unit upon completion of the synchronization, an acknowledgement of successful synchronization.

17 Claims, 6 Drawing Sheets

300C

500

REMOTE ACTIVATED GARAGE DOOR OPENER FUNCTIONS VIA A GRAPHICAL USER INTERFACE IN A VEHICLE

FIELD OF THE INVENTION

The subject invention relates to vehicle systems and, more particularly, to remote activated garage door opener functions via a graphical user interface in a vehicle.

BACKGROUND

Currently, many vehicle owners enjoy the convenience of universal garage door openers that enable individuals to open and close garage doors without having to exit a vehicle. In some cases, a garage door opener unit is installed in a garage and a remote control device is provided to control the operation of the unit. In other cases, some vehicles are equipped with buttons that can be programmed for use with a garage door opener unit.

What is desirable is a way to integrate garage door opener functions within an existing display device of the vehicle, such as a display device of a vehicle's infotainment system.

SUMMARY OF THE INVENTION

In one exemplary embodiment of the invention a system is provided. The system includes a computer processor embedded in a vehicle, a transceiver, a display device, and a vehicle network communicatively coupling the computer processor to the transceiver and to the display device. The system also includes logic executable by the computer processor. The logic is configured to implement a method. The method includes providing a graphical user interface on the display device and prompting a user via the graphical user interface to program a garage door opener unit that is in communicative range of the transceiver. The method also includes receiving a response, from the user via an input control of the display device, indicating an acceptance by the user to program the garage door opener unit. Upon determining via the transceiver that the garage door opener unit is in programming mode, the method includes transmitting a request, to the transceiver over the vehicle network, to initiate synchronization between the vehicle and the garage door opener unit. The request is forwarded by the transceiver to the garage door opener unit. The method includes receiving, from the garage door opener unit upon completion of the synchronization, an acknowledgement of successful synchronization. The synchronization is operable to enable the user to control operation of the garage door opener unit via the graphical user interface.

In another exemplary embodiment of the invention, a method is provided. The method includes providing, via a computer processor embedded in a vehicle, a graphical user interface on a display device and prompting a user via the graphical user interface to program a garage door opener unit that is in communicative range of a transceiver. The transceiver and the display device are communicatively coupled to the computer processor over a vehicle network. The method also includes receiving a response, from the user via an input control of the display device, indicating an acceptance by the user to program the garage door opener unit. Upon determining via the transceiver that the garage door opener unit is in programming mode, the method includes transmitting a request, to the transceiver over the vehicle network, to initiate synchronization between the vehicle and the garage door opener unit. The request is forwarded by the transceiver to the garage door opener unit. The method includes receiving, from the garage door opener unit upon completion of the synchronization, an acknowledgement of successful synchronization. The synchronization is operable to enable the user to control operation of the garage door opener unit via the graphical user interface.

In yet another exemplary embodiment of the invention a computer program product is provided. The computer program product includes a storage medium having computer program instructions embodied thereon, which when executed by a computer processor, cause the computer processor to implement a method. The method includes providing a graphical user interface on a display device and prompting a user via the graphical user interface to program a garage door opener unit that is in communicative range of a transceiver. The transceiver and the display device are communicatively coupled to the computer processor over a vehicle network. The method also includes receiving a response, from the user via an input control of the display device, indicating an acceptance by the user to program the garage door opener unit. Upon determining via the transceiver that the garage door opener unit is in programming mode, the method includes transmitting a request, to the transceiver over the vehicle network, to initiate synchronization between the vehicle and the garage door opener unit. The request is forwarded by the transceiver to the garage door opener unit. The method also includes receiving, from the garage door opener unit upon completion of the synchronization, an acknowledgement of successful synchronization. The synchronization is operable to enable the user to control operation of the garage door opener unit via the graphical user interface.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
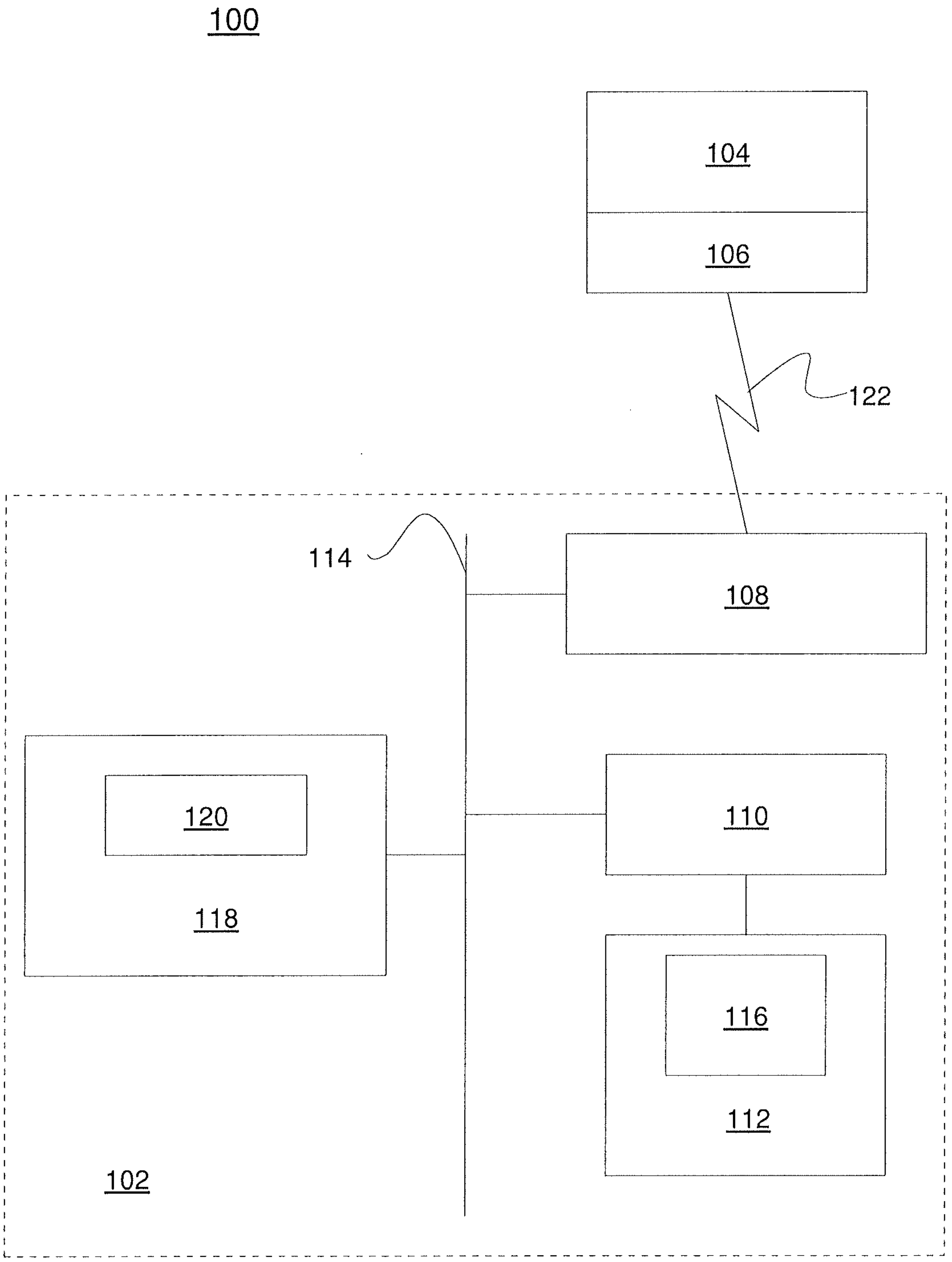
FIG. 1 is a block diagram of a system upon which remote activated garage door opener functions via a graphical user interface in a vehicle may be implemented in accordance with an embodiment.
Figure 2:
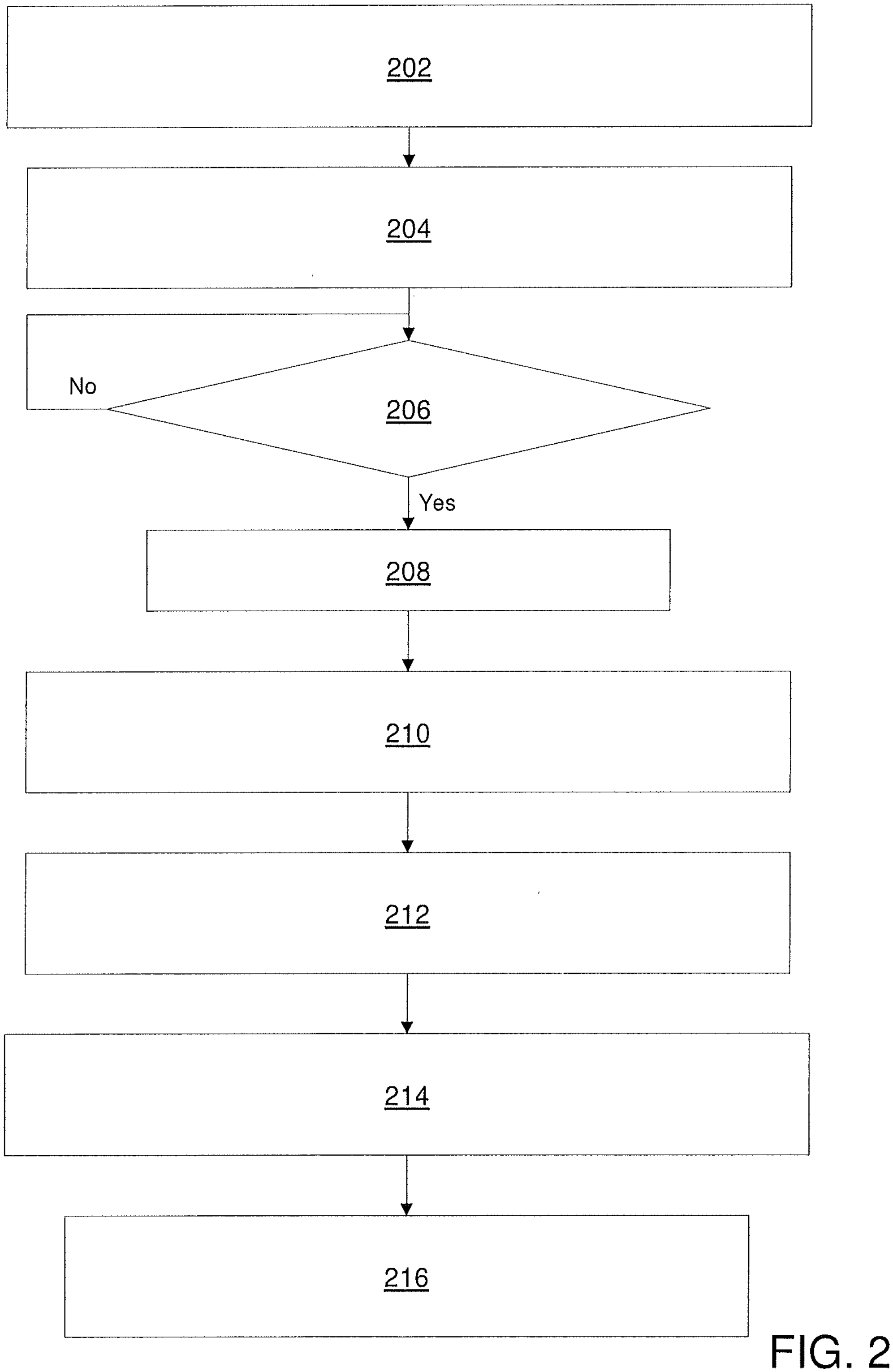
FIG. 2 is a flow diagram describing a process for programming a garage door opener unit via a graphical user interface in a vehicle in accordance with an embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, remote activated garage door opener functions are implemented through a graphical user interface of a vehicle's display device. The graphical user interface is configured to receive user input through the display device, which input enables the user to synchronize components of a vehicle with the garage door opener unit, open and close garage doors programmed through the user interface, and view a status of the garage doors (e.g., open or closed). By providing the remote activated garage door opener functions via the graphical user interface and vehicle display device, the need for mechanically controlled buttons in the vehicle or removable remote devices is eliminated. These and other features of the remote activated garage door opener functions are described herein.

Turning now to FIG. 1, a system 100 upon which the remote activated garage door opener functions may be implemented will now be described in an embodiment. The system 100 includes a portion of a vehicle 102 including components used in performing the remote activated garage door opener functions. The vehicle 102 may be any type of automobile known in the art.

As shown in FIG. 1, the system 100 also includes a garage door opener unit 104 that is wirelessly coupled to the vehicle 102 over a short range communication network 122 (e.g., using radio frequency transmissions). The garage door opener unit 104 includes a transceiver 106 which communicates with a transceiver 108 of the vehicle 102. Each of the transceivers 106 and 108 may be implemented via a radio frequency antenna to send and receive signals. In addition to the transceiver 108, the garage door opener unit 104 may include various components (not shown), such as a drive mechanism, a power unit, one or more light emitting diodes (LEDs), a processor and logic that enable the unit 104 to be programmed and activated. The garage door opener unit 104 may be installed in a garage having one or more garage doors.

As shown in FIG. 1, the vehicle 102 includes a computer processor 110 and an infotainment system 118, each of which is communicatively coupled to a vehicle network 114. The computer processor 110 may include computer hardware and related circuitry. The computer processor 110 executes logic 116 for implementing the remote activated garage door opener functions described herein. In an embodiment, the logic 116 may be stored in a memory device 112 that is communicatively coupled to the computer processor 110.

The memory device 112 may be implemented as a storage device (e.g., hard disk drive, removable storage unit, cache memory, etc.) that stores data produced via the computer processor 110 and logic 116, as will be described further herein.

The infotainment system 118 may be integrated into a dashboard or center stack system of the vehicle 102. The infotainment system 118 includes a display device 120 and input controls, which are further illustrated in FIGS. 3A-3D and FIG. 5. The display device 120 and the input controls are used in implementing features of the infotainment system 118 (e.g., listening to music, navigation assistance, etc.), as well as implementing features of the remote activated garage door opener functions. The input controls of the infotainment system 118 may include physical controls (knobs or buttons as shown in FIGS. 3A-3D and FIG. 5) or may be implemented by voice recognition technology and voice commands. In another embodiment, the input controls may be implemented directly through the display device 120 if the display device is configured with touch screen technology. The display device 120 may be implemented in part as a liquid crystal display or plasma device. In an embodiment, the logic 116 is configured to receive inputs via the input controls of the display device 120 for assisting a user in programming remote operation of the garage door opener unit 104 and to process these inputs to synchronize the vehicle 102 with the garage door opener unit 104 and to remotely activate garage doors.

The vehicle network 114 may be a local area network (LAN) implemented through physical wiring or may be a wireless network. In one embodiment, the vehicle network 114 is implemented through a serial data bus.

Turning now to FIG. 2 and FIGS. 3A-3D, a process and user interface screens, respectively, for programming the garage door opener unit 104 will now be described. The user interface screens are illustrated on display devices 300A-300D of FIGS. 3A-3D, which display devices correspond to the display device 120 described in FIG. 1. The process described in FIG. 2 assumes that the vehicle 102 is within communicative range of the garage door opener unit 104 via the transceivers 106 and 108.

At step 202, the logic 116 prompts the user to synchronize the vehicle 102 with the garage door opener unit 104. The prompt may be implemented through a message displayed on the display screen 120. In an embodiment, the prompt is initiated in response to the user's selection of an option on a menu screen of the display device 120. For example, in FIG. 3A a prompt 302 "SELECT [X] TO PROGRAM REMOTE GARAGE DOOR OPENER" may be provided for the user, in which the [X] refers to a particular control button (e.g., one of input controls 320) on the display device 300A.

At step 204, the logic 116 receives a response accepting the prompt from the user, e.g., via one of the input controls 320 on the display device 300A.

Figure 3A:
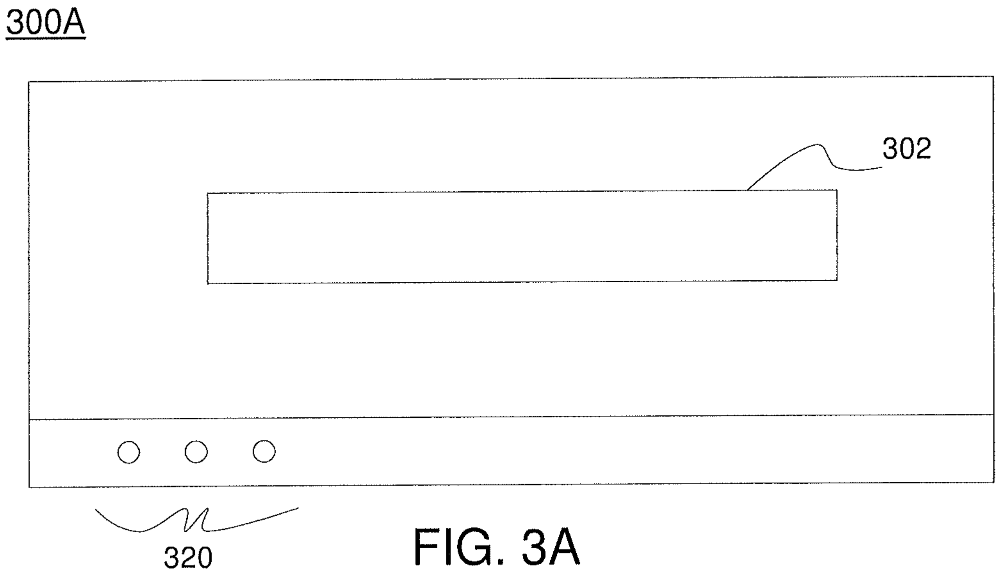
FIGS. 3A-3D are user interface screens for programming a garage door opener unit in accordance with an embodiment.
Figure 3B:
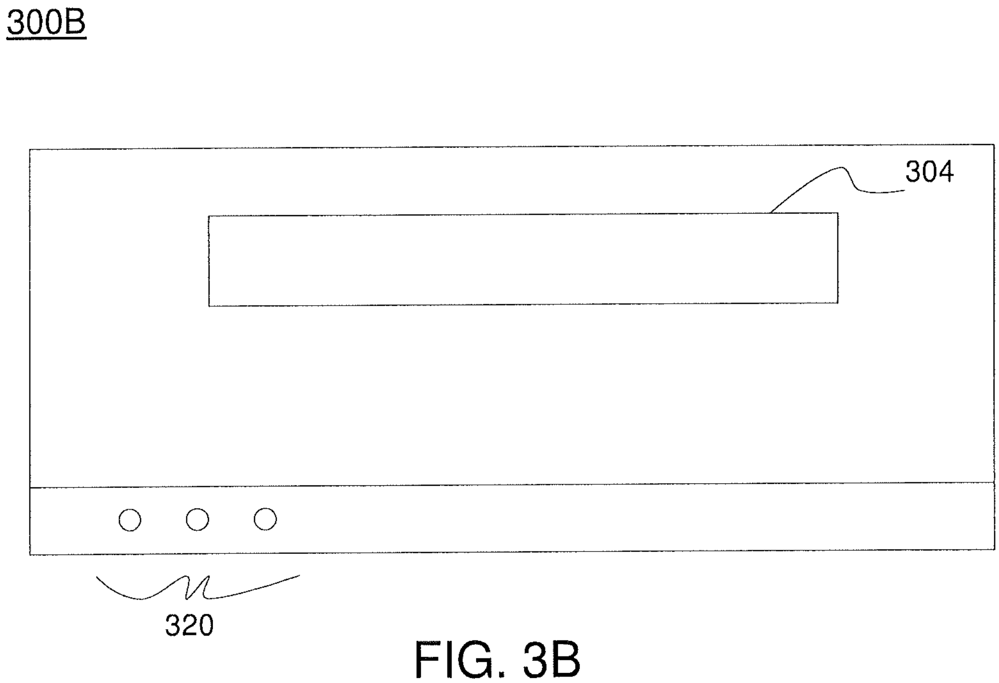

The logic 116 then prompts the user to place the garage door opener unit 104 in programming mode. Placing the garage door opener unit 104 in programming mode may involve exiting the vehicle 102 by the user and physically activating a programming option on the garage door opener unit 104. When the garage door opener unit 104 is in programming mode, this means it is in a state for receiving communications from the vehicle 102, which communications are operable for synchronizing the vehicle 102 with the unit 104, such that only the vehicle 102 may activate the garage door opener unit 104 functions with respect to opening and closing the garage doors. As shown in FIG. 3B, a user interface screen on display device 300B illustrates a prompt 304 "PLACE GARAGE DOOR OPENER UNIT IN PROGRAMMING MODE."

At step 206, the logic 116 determines whether the garage door opener unit 104 is in programming mode. This may be implemented by sending a signal over the vehicle network 114 to the transceiver 108, and the transceiver 108 sends the signal to the transceiver 106 of the garage door opener unit 104 via the network 122 requesting a status of the unit 104. The transceiver 108 receives this status from the garage door opener unit 104 and sends the status over the vehicle network 114 to the computer processor 110. If the logic 116 determines that the garage door opener unit 104 is not in programming mode, the logic 116 is configured to wait a specified period of time (e.g., 5 seconds) for the user to adjust the garage door opener unit 104 at step 208 and check again. The process returns to step 206.

If, however, the logic 116 determines that the garage door opener unit 104 is in programming mode, the logic 116 transmits a request over the vehicle network 114 to the transceiver 108 to initiate a synchronization process with the garage door opener unit 104 at step 210. The transceiver 108, in turn, forwards the request to the transceiver 106 of the garage door opener unit 104 at step 212.

Figure 3C:
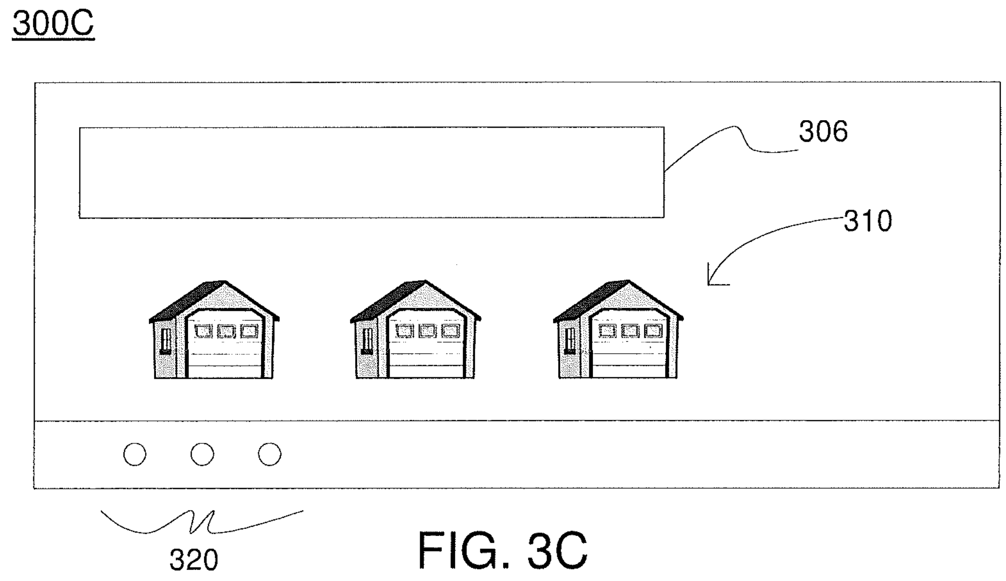

In an embodiment, and as shown on display device 300C of FIG. 3C, the logic 116 may implement the synchronization process by providing a prompt 306 "SELECT DOOR ICON TO INITIATE SYNCHRONIZATION." In this embodiment, the logic 116 displays an icon for each candidate garage door to be programmed. As shown in FIG. 3C for purposes of illustration, there are three virtual representations of garage doors collectively referred to as icons 310. Each of the icons 310 may be associated with a corresponding unique identifier that is used by the logic 116 to differentiate among the garage doors to which the icons 310 are assigned during the synchronization process. The logic 116 may be configured to instruct the user via the input controls 320 (or directly through a touch screen) to select one of the icons 310 for a corresponding garage door to synchronize with the garage door opener unit 104.

Once the user has selected an icon, a request signal is transmitted by the computer processor 110 over the vehicle network 114 to the transceiver 108. The transceiver 108, in turn, creates and sends a unique synchronization request for that icon 310 to the selected garage door opener unit 104 at step 212, via the transceiver 108 over the short range communication network 122. The garage door opener unit 104 receives and stores this unique synchronization request.

Figure 3D:
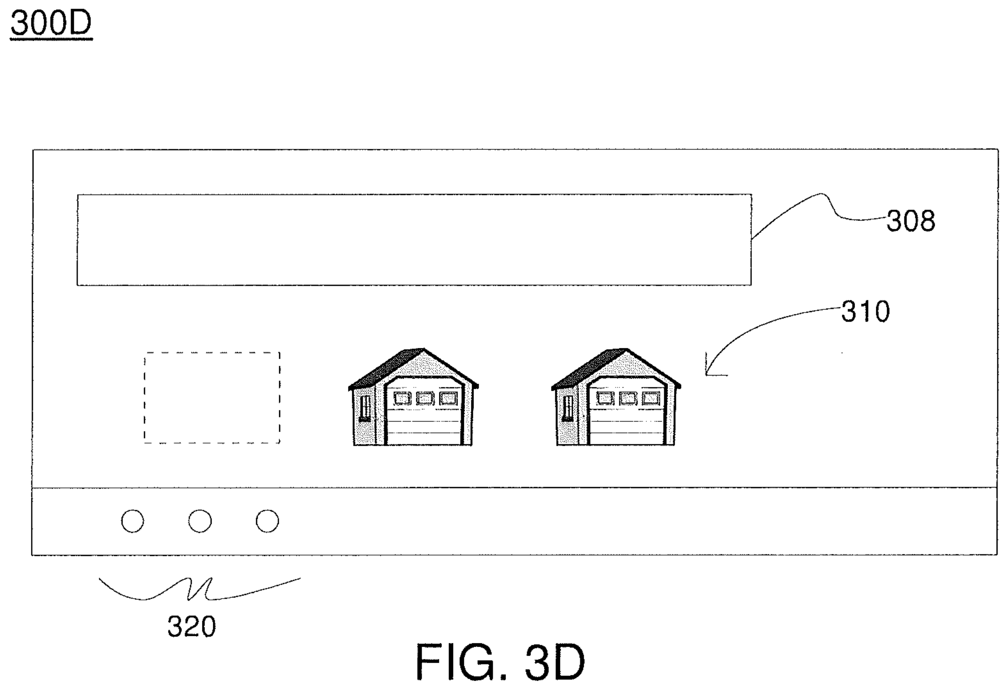

In an embodiment, the garage door opener unit 104 may transmit notification of successful synchronization for the selected icon 310 over the short-range communication network 122 back to the transceiver 108, which in turn may communicate the notification acknowledgement at step 214, and the logic 116 may store the notification acknowledgement in the memory device 104. The logic 116 may display an indication of the successful synchronization for the selected door on the display device at step 216. As shown in FIG. 3D, an acknowledgement message and prompt 308 "SYNCHRONIZATION SUCCESSFUL—SELECT NEXT DOOR TO SYNCHRONIZE" may be displayed on display device 300D. In an embodiment, the virtual representation of the successfully synchronized garage door may be removed from the user interface screen of the display device 300D, as shown by dotted lines in FIG. 3D. The synchronization process described above may be repeated for each garage door to be programmed by the user.

Figure 4:
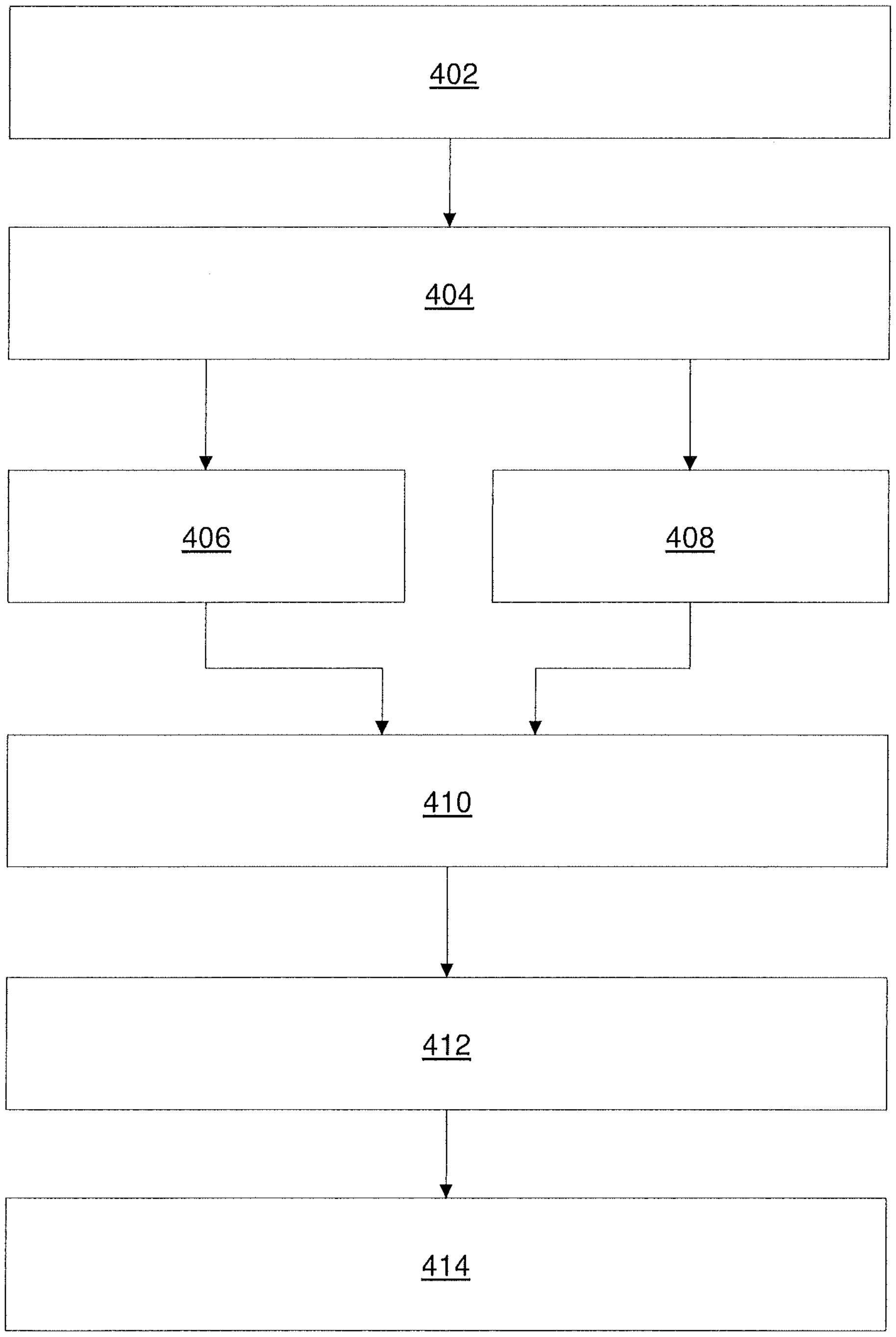
FIG. 4 is a flow diagram describing a process for activating a garage door opener unit via a graphical user interface in a vehicle in accordance with an embodiment.

Once the vehicle 102 has been successfully synchronized with the garage door opener unit 104, the system is ready to be implemented with regard to activating garage doors (e.g., open and close) and viewing a status of a garage door. Turning now to FIG. 4, a process for implementing the remote activated garage door opener functions will now be described in an embodiment. The process described in FIG. 4 assumes that the vehicle 102 is in communicative range of the garage door opener unit 104.

At step 402, the logic 116 prompts the user to select a function via the graphical user interface. In an embodiment, the prompt may occur through an instruction presented on the display device similar to those described in FIGS. 3A-3D above. The user may scroll or traverse a menu screen of options that include the function described herein.

At step 404, the logic 116 receives the selected function from the user via the graphical user interface and deciphers the function (e.g., to open or close a garage door (step 406) or to view a status of the garage doors (step 408). In the case of opening or closing a garage door (step 406), the user selects a corresponding function via the graphical user interface. In this embodiment, the virtual representations of garage doors previously programmed by the user may be displayed on the display device, and the user may indicate a particular garage door by selecting a corresponding input control or may directly select an icon from the icons using a touch screen. The logic 116 identifies the garage door to be opened by the unique identifier associated with the selected icon. Thus, the logic 116 retrieves the corresponding identifier from the memory device 104 and identifies the assigned frequency for this icon. Likewise, if the function is to review a status of the garage doors (step 408), the user selects a corresponding function via the graphical user interface.

Figure 5:
FIG. 5 is a user interface screen for activating a garage door opener unit in accordance with an embodiment.

The computer processor 110 transmits a request over the vehicle network 114 to the transceiver 108 corresponding to the requested function at step 410, and the transceiver 108 forwards the request over the short-range network 122 to the transceiver 106 using the assigned frequency at step 412. The garage door opener unit 104 identifies the assigned frequency as being associated with a particular garage door and performs the corresponding function (e.g., open or close garage door or identify a status of the doors). This status function may be useful, e.g., when the user is driving away from the garage and is unable to remember whether he or she closed the garage doors. The status of the garage doors (e.g., open or closed) may be displayed on the display screen for the user at step 412. As shown in FIG. 5, for example, a display device 500 illustrates three virtual representations of garage doors, collectively referred to as icons 510, whereby one of the icons 512 reflects that a first garage door is open while the other two are closed.

Technical effects of the invention include remote activated garage door opener functions implemented through a graphical user interface of a vehicle's display device. The graphical user interface is configured to receive user input through the display device, which input enables the user to synchronize components of a vehicle with the garage door opener unit, open and close garage doors programmed through the user interface, and view a status of the garage doors (e.g., open or closed). By providing the remote activated garage door opener functions via the graphical user interface and vehicle display device, the need for mechanically controlled buttons in the vehicle or removable remote devices is eliminated.

As described above, the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the present application.

What is claimed is:

1. A system, comprising:

a computer processor embedded in a vehicle;

a transceiver;

a display device;

a vehicle network communicatively coupling the computer processor to the transceiver and to the display device; and logic executable by the computer processor, the logic configured to implement a method, the method comprising:

providing a graphical user interface on the display device and prompting a user via the graphical user interface to program a garage door opener unit that is in communicative range of the transceiver;

receiving a response, from the user via an input control of the display device, indicating an acceptance by the user to program the garage door opener unit;

upon determining via the transceiver that the garage door opener unit is in programming mode, transmitting a request, to the transceiver over the vehicle network, to initiate synchronization between the vehicle and the garage door opener unit, the request forwarded by the transceiver to the garage door opener unit; and receiving, from the garage door opener unit upon completion of the synchronization, an acknowledgement of successful synchronization, the synchronization operable to enable the user to control operation of the garage door opener unit via the graphical user interface, wherein implementing the synchronization includes:

presenting a virtual representation of a garage door on the display screen via the graphical user interface, the virtual representation associated with a unique identifier;

prompting the user, via the graphical user interface, to select the virtual representation for the synchronization;

receiving a selection of the virtual representation from the user via an input control of the display device; and transmitting the unique identifier to the transceiver over the vehicle network, the transceiver forwarding the unique identifier to the garage door opener unit, the unique identifier mapping the virtual representation to a garage door controlled by the garage door opener unit.

2. The system of claim 1, wherein the logic is further configured to implement:

displaying an indication of the successful synchronization on the display device.

3. The system of claim 1, wherein the logic is further configured to implement:

displaying the virtual representation on the display device with instructions to perform an operation with respect to the garage door associated with the virtual representation;

receiving a selection for the operation from the user via the display device; and transmitting a request to the transceiver via the vehicle network, the transceiver forwarding the request to the garage door opener unit, the operation including one of opening the garage door and closing the garage door.

4. The system of claim 3, wherein the logic is further configured to implement:

receiving, via the transceiver, a status signal from the garage door opener indicating a status of the garage door; and displaying a virtual representation of the status on the display device, the virtual representation of the status including one of an open garage door and a closed garage door.

5. The system of claim 4, wherein the logic is further configured to implement:

displaying, in a minimized window on the display screen, the virtual representation of the status of the garage door.

6. The system of claim 1, wherein the vehicle network includes a local interconnect network.

7. The system of claim 1, wherein the display screen forms part of an infotainment system of the vehicle.

8. A method, comprising:

providing, via a computer processor embedded in a vehicle, a graphical user interface on a display device and prompting a user via the graphical user interface to program a garage door opener unit that is in communicative range of a transceiver, the transceiver and the display device communicatively coupled to the computer processor over a vehicle network;

receiving a response, from the user via an input control of the display device, indicating an acceptance by the user to program the garage door opener unit;

upon determining via the transceiver that the garage door opener unit is in programming mode, transmitting a request, to the transceiver over the vehicle network, to initiate synchronization between the vehicle and the garage door opener unit, the request forwarded by the transceiver to the garage door opener unit; and receiving, from the garage door opener unit upon completion of the synchronization, an acknowledgement of successful synchronization, the synchronization operable to enable the user to control operation of the garage door opener unit via the graphical user interface, wherein implementing the synchronization includes presenting a virtual representation of a garage door on the display screen via the graphical user interface, the virtual representation associated with a unique identifier;

prompting the user, via the graphical user interface, to select the virtual representation for the synchronization;

receiving a selection of the virtual representation from the user via an input control of the display device; and transmitting the unique identifier to the transceiver over the vehicle network, the transceiver forwarding the unique identifier to the garage door opener unit, the unique identifier mapping the virtual representation to a garage door controlled by the garage door opener unit.

9. The method of claim 8, further comprising:

displaying an indication of the successful synchronization on the display device.

10. The method of claim 8, further comprising:

displaying the virtual representation on the display device with instructions to perform an operation with respect to the garage door associated with the virtual representation;

receiving a selection for the operation from the user via the display device; and transmitting a request to the transceiver via the vehicle network, the transceiver forwarding the request to the garage door opener unit, the operation including one of opening the garage door and closing the garage door.

11. The method of claim 10, further comprising:

receiving, via the transceiver, a status signal from the garage door opener indicating a status of the garage door; and displaying a virtual representation of the status on the display device, the virtual representation of the status including one of an open garage door and a closed garage door.

12. The method of claim 11, further comprising:

displaying, in a minimized window on the display screen, the virtual representation of the status of the garage door.

13. The method of claim 8, wherein the vehicle network includes a local interconnect network.

14. The method of claim 8, wherein the display screen forms part of an infotainment system of the vehicle.

15. A computer program product comprising a storage medium having computer program instructions embodied thereon, which when executed by a computer, cause the computer to implement a method, the method comprising:

providing a graphical user interface on a display device and prompting a user via the graphical user interface to program a garage door opener unit that is in communicative range of a transceiver, the transceiver and the display device communicatively coupled to the computer processor over a vehicle network;

receiving a response, from the user via an input control of the display device, indicating an acceptance by the user to program the garage door opener unit;

upon determining via the transceiver that the garage door opener unit is in programming mode, transmitting a request, to the transceiver over the vehicle network, to initiate synchronization between the vehicle and the garage door opener unit, the request forwarded by the transceiver to the garage door opener unit; and receiving, from the garage door opener unit upon completion of the synchronization, an acknowledgement of successful synchronization, the synchronization operable to enable the user to control operation of the garage door opener unit via the graphical user interface, wherein implementing the synchronization includes:

presenting a virtual representation of a garage door on the display screen via the graphical user interface, the virtual representation associated with a unique identifier;

prompting the user, via the graphical user interface, to select the virtual representation for the synchronization;

receiving a selection of the virtual representation from the user via an input control of the display device; and transmitting the unique identifier to the transceiver over the vehicle network, the transceiver forwarding the unique identifier to the garage door opener unit, the unique identifier mapping the virtual representation to a garage door controlled by the garage door opener unit.

16. The computer program product of claim 15, wherein the method further comprises:

displaying the virtual representation on the display device with instructions to perform an operation with respect to the garage door associated with the virtual representation;

receiving a selection for the operation from the user via the display device; and transmitting a request to the transceiver via the vehicle network, the transceiver forwarding the request to the garage door opener unit, the operation including one of opening the garage door and closing the garage door.

17. The computer program product of claim 16, wherein the method further comprises:

receiving, via the transceiver, a status signal from the garage door opener indicating a status of the garage door; and displaying a virtual representation of the status on the display device, the virtual representation of the status including one of an open garage door and a closed garage door.

* * * * *